United States Patent [19]
Krone

[11] Patent Number: 5,628,491
[45] Date of Patent: May 13, 1997

[54] PILOT VALVE

[75] Inventor: Otto Krone, Beesten, Germany

[73] Assignee: Westfalia Separator Aktiengesellschaft, Oelde, Germany

[21] Appl. No.: 530,348

[22] PCT Filed: Feb. 24, 1994

[86] PCT No.: PCT/EP94/00528

§ 371 Date: Sep. 29, 1995

§ 102(e) Date: Sep. 29, 1995

[87] PCT Pub. No.: WO94/23563

PCT Pub. Date: Oct. 27, 1994

[30] Foreign Application Priority Data

Apr. 15, 1993 [DE] Germany .............. 43 12 276.0

[51] Int. Cl.$^6$ .................................. F16K 31/06
[52] U.S. Cl. ..................... 251/129.21; 251/30.05
[58] Field of Search ............... 251/129.21, 129.17, 251/129.15, 30.01, 30.05, 331

[56] References Cited

U.S. PATENT DOCUMENTS

| | | |
|---|---|---|
| 3,498,330 | 3/1970 | Paige ............... 251/129.21 X |
| 4,196,751 | 4/1980 | Fischer et al. |
| 4,875,499 | 10/1989 | Fox ............... 251/129.21 X |
| 4,969,629 | 11/1990 | Athanassiu ............ 251/129.21 X |

FOREIGN PATENT DOCUMENTS 0214084  12/1983  Japan ............... 251/129.21

Primary Examiner—Kevin Lee
Attorney, Agent, or Firm—Sprung Horn Kramer & Woods

[57] ABSTRACT

A pilot valve for controlling a pneumatically actuated main valve of a milking-system pulsator, has an electromagnet that it is alternately energized and de-energized displacing an armature back and forth between each end of a stroke. At one end, the armature seals an air-supply line and at the other end a vacuumizing line. The lines are accordingly alternately connected to a valve chamber, and the valve chamber communicates with the main valve through a control channel. The armature is connected to a diaphragm so as to provide axial guidance for the armature without friction. The diaphragm is made of resilient material and is interposed between the armature and the electromagnet such that, when the armature is at one end of its stroke, it seals off the air-supply line.

5 Claims, 1 Drawing Sheet

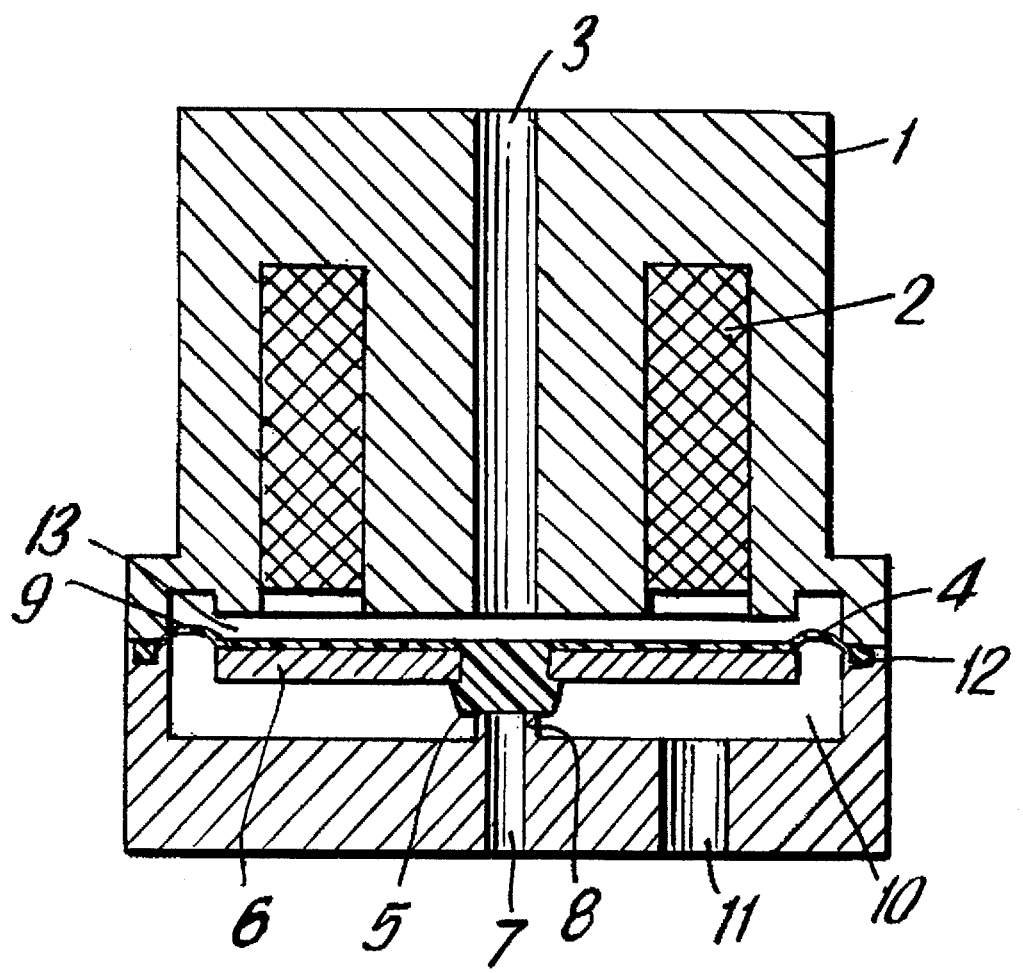

PILOT VALVE

BACKGROUND OF THE INVENTION

The present invention concerns a pilot valve. The pilot valve controls the pneumatically actuated main valve of a milking-system pulsator. An electromagnet is alternately energized and de-energized, displacing an armature back and forth between each end of a stroke. At one end the armature seals an air-supply line and at the other end a vacuumizing line. The lines are accordingly alternately connected to a valve chamber. The valve chamber communicates with the main valve through a control channel. The armature is connected to a diaphragm such as to provide axial guidance for the armature without friction.

A valve of this type is known for example from U.S. Pat. No. 4,196,751. The diaphragm in this valve is on the end of the armature opposite the electromagnet. To ensure that the air-supply line can be sealed, the surface of the armature is provided with an appropriate seal. The diaphragm is also in the form of a spring that opposes the motion of the armature toward the air-supply line with considerable resistance. Powerful reversing forces are necessary to overcome this resistance.

A valve is known from German U 9 114 953.3 wherein the armature extends through a diaphragm on the end opposite the electromagnet. When the magnet is energized, the armature is attracted to it and maintained there by remanence. Powerful reversing forces are necessary to overcome the remanence. This valve is only intended to control the flow of a medium, and it is not appropriate for connecting a control channel alternately to an air-supply line and a vacuumizing line.

SUMMARY OF THE INVENTION

The object of the present invention is a pilot valve that will be inexpensive to manufacture and does not require powerful reversing forces.

This object is attained in accordance with the present invention in that the diaphragm is made of a resilient material and is interposed between the armature and the electromagnet such that, when the armature is at one end of its stroke, it seals off the air-supply line.

A diaphragm made of resilient material makes it possible to displace the armature with relatively feeble forces. Interposing the diaphragm between the armature and the magnet prevents the armature from adhering to the magnet due to remanence. The diaphragm must in this event be made of a non-magnetic material, rubber for example. The reversing forces can be very weak because of the lack of friction and remanence. Since the diaphragm can seal off the air-supply line, no extra seal is necessary, which is a very economical result.

The armature is attached to the diaphragm in another advantageous embodiment of the present invention by an elevation on the diaphragm and a bore in the armature. This approach not only allows cost-effective attachment but also eliminates the need for an extra seal because the elevation seals off the vacuumizing line while the armature is at one end of its stroke.

The diaphragm in another advantageous embodiment is provided with a vent, through which the valve chamber communicates with another valve chamber, into which the air-supply line opens. No special communicating channel will accordingly be necessary.

It is of advantage for the diaphragm to have a bead that seals off the valve chambers from the atmosphere. No special seals will accordingly be necessary.

BRIEF DESCRIPTION OF THE DRAWING

The present invention will now be specified with reference to the accompanying drawing, which comprises a single FIGURE, which is a cross-sectional view of a valve according to the invention.

DETAILED DESCRIPTION OF THE INVENTION

A valve 1 is provided with an electromagnet 2. Electromagnet 2 itself is provided with an air-supply line 3. Air-supply line 3 can be sealed off by . . . one end of its stroke. Diaphragm 4 is provided with a vent 9. Air-supply line 3 communicates with a valve chamber 10 through vent 9. A control channel 11 extends out of valve chamber 10. Air-supply line 3 opens into another valve chamber 13. Diaphragm 4 is surrounded by a bead 12 that seals off first valve chamber 10 and second valve chamber 13 from the atmosphere.

Once electromagnet 2 has been de-energized, armature 6 will travel to the end of the stroke illustrated in the figure, with elevation 5 sealing off vacuumizing line 7. Air-supply line 3, second valve chamber 13, and first valve chamber 10 now communicate through vent 9, and atmospheric air can flow through control channel 11 into a pneumatically controlled main valve 20 and reverse it. During this reversal, the flowing air acts on the top of diaphragm 4 along with the establishing atmospheric pressure, which, because of the requisite pressure gradient, is higher than the pressure on the bottom of the diaphragm. Armature 6 is accordingly displaced toward the valve seat 8 in vacuumizing line 7 independently of the installed position of valve 1. When electromagnet 2 is energized, armature 6 is displaced upward along with diaphragm 4 and comes to rest against electromagnet 2. Diaphragm 4 is now closing off air-supply line 3 while vacuumizing line 7 is open. The vacuum is transmitted to control channel 11 by way of first valve chamber 10 and hence to the main valve and reverses it again. The reverses occur in a prescribed rhythm, producing variable pressure in the vestibules of unillustrated milking cups. Two valves operating in opposite directions are also frequently provided to allow what is called alternating-beat milking.

Since diaphragm 4 assumes the sealing function at each end of the stroke of armature 6 and also seal off valve chambers 10 and 13 from the atmosphere, the diaphragm is the only component that will need to be replaced due to wear or aging.

I claim:

1. A pilot valve for controlling a pneumatically actuated main valve of a milking-system pulsator, with an electromagnet that is alternately energized and de-energized, displacing an armature back and forth between each end of a stroke, an air-supply line is sealed by the armature at one end of the stroke and a vacuumizing line is sealed at the other end of the stroke and the lines are accordingly alternately connected to a valve chamber, the valve chamber communicates with the main valve through a control channel, a diaphragm of resilient material is connected to the armature such as to provide axial guidance for the armature without friction and is interposed between the armature and the electromagnet such that, when the armature is at one end of its stroke, it seals off the air-supply line.

2. The pilot valve as in claim 1, wherein the armature is attached to the diaphragm by an elevation on the diaphragm.

3. The pilot valve as in claim 2, wherein the elevation seals off the air-supply line while the armature is at one end of its stroke.

4. The pilot valve as in claim 1, wherein the diaphragm is provided with a vent, through which the valve chamber communicates with another valve chamber, into which the air-supply line opens.

5. The pilot valve as in claim 4, wherein the diaphragm has a bead that seals off the valve chamber and said another valve chamber from the atmosphere.

* * * * *